(12) United States Patent
Qiao et al.

(10) Patent No.: US 10,831,588 B2
(45) Date of Patent: Nov. 10, 2020

(54) DIAGNOSIS OF DATA CENTER INCIDENTS WITH AUGMENTED REALITY AND COGNITIVE ANALYTICS

(71) Applicant: International Business Machines Corporation, Armonk, NY (US)

(72) Inventors: Mu Qiao, Belmont, CA (US); Rakesh Jain, San Jose, CA (US); Ramani Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/162,181

(22) Filed: Oct. 16, 2018

(65) Prior Publication Data

US 2020/0117529 A1    Apr. 16, 2020

(51) Int. Cl.
| | | |
|---|---|---|
| *G06F 11/07* | (2006.01) | |
| *G06F 11/30* | (2006.01) | |
| *G06N 7/00* | (2006.01) | |
| *G06T 19/00* | (2011.01) | |
| *G06F 16/904* | (2019.01) | |
| *G06F 16/901* | (2019.01) | |

(52) U.S. Cl.
CPC ........ *G06F 11/079* (2013.01); *G06F 11/0727* (2013.01); *G06F 11/3055* (2013.01); *G06F 16/904* (2019.01); *G06F 16/9024* (2019.01); *G06N 7/005* (2013.01); *G06T 19/006* (2013.01)

(58) Field of Classification Search
CPC .............. G06F 11/079; G06F 11/3055; G06F 11/3447; G06F 11/3452; G06F 11/0793
See application file for complete search history.

(56) References Cited

U.S. PATENT DOCUMENTS

| | | | |
|---|---|---|---|
| 8,760,471 B2 | 6/2014 | Ihara et al. | |
| 8,839,036 B2 | 9/2014 | Rymeski et al. | |
| 8,918,494 B2 * | 12/2014 | Windell | ............. H04L 43/0817 |
| | | | 709/223 |
| 9,122,499 B2 | 9/2015 | Bittner et al. | |
| 9,472,028 B2 | 10/2016 | Abdel-Rahman et al. | |
| 9,557,807 B2 | 1/2017 | Mick et al. | |
| 9,672,648 B2 * | 6/2017 | Park | ........................ G06T 11/00 |
| 9,838,844 B2 * | 12/2017 | Emeis | ................... G06T 19/006 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

*Primary Examiner* — Yolanda L Wilson
(74) *Attorney, Agent, or Firm* — Sherman IP LLP; Kenneth L. Sherman; Steven Laut

(57) ABSTRACT

One embodiment provides a method for diagnosing data center incidents including receiving a data center incident report including information technology (IT) device incident information. Augmented reality (AR) is applied for an AR interface for receiving incident evidence information based on the IT device incident information. The incident evidence information is sent to a cognitive analytical process. Using the cognitive analytical process, statistical inference is determined and an incident diagnosis recommendation including analytical results is generated. The analytical results are received by the AR interface for determining a root cause of the incident report.

20 Claims, 9 Drawing Sheets

(56) References Cited

U.S. PATENT DOCUMENTS

| | | | |
|---|---|---|---|
| 10,410,424 B1* | 9/2019 | Khokhar | G06T 19/006 |
| 2012/0249588 A1 | 10/2012 | Tison et al. | |
| 2013/0031202 A1* | 1/2013 | Mick | G06F 3/00 |
| | | | 709/217 |
| 2013/0120449 A1* | 5/2013 | Ihara | G02B 27/017 |
| | | | 345/633 |
| 2014/0351408 A1 | 11/2014 | Anderson et al. | |
| 2015/0121136 A1* | 4/2015 | Namkoong | G06F 11/079 |
| | | | 714/15 |
| 2015/0280968 A1* | 10/2015 | Gates | G06F 11/30 |
| | | | 714/37 |
| 2015/0286515 A1* | 10/2015 | Monk | G06F 11/0709 |
| | | | 714/57 |
| 2016/0140868 A1 | 5/2016 | Lovett et al. | |
| 2018/0173599 A1* | 6/2018 | Kalech | G06F 11/008 |
| 2018/0285181 A1* | 10/2018 | Zasadzinski | G06N 5/045 |

* cited by examiner

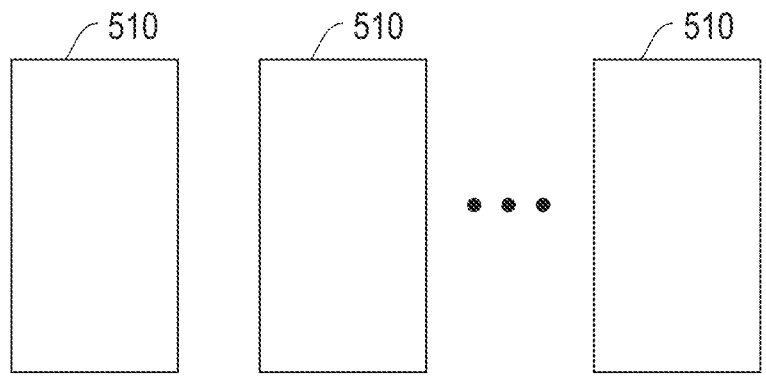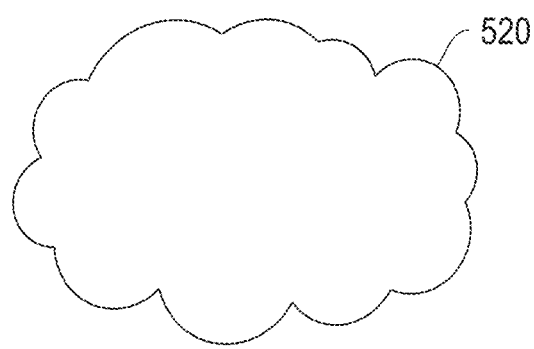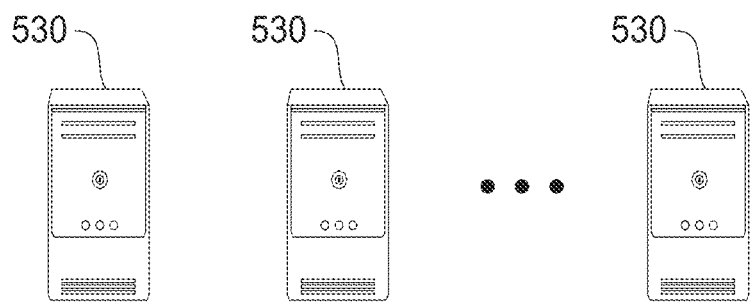
FIG. 5

DIAGNOSIS OF DATA CENTER INCIDENTS WITH AUGMENTED REALITY AND COGNITIVE ANALYTICS

BACKGROUND

Data centers have very complex information technology (IT) infrastructures, usually with hundreds of thousands of devices, such as servers, network devices, uninterruptible power sources (UPS), etc. Given such a huge number of IT assets, many factors can cause incidents in the data center. For example, many data center resource failures are caused by changes, such as patching an operating system, updating a firmware, replacing a UPS, etc. There is a strong correlation between the number of changes and the number of incidents in data centers.

SUMMARY

Embodiments relate to diagnosing data center incidents. One embodiment provides a method for diagnosing data center incidents including receiving a data center incident report including information technology (IT) device incident information. Augmented reality (AR) is applied for an AR interface for receiving incident evidence information based on the IT device incident information. The incident evidence information is sent to a cognitive analytical process. Using the cognitive analytical process, statistical inference is determined and an incident diagnosis recommendation including analytical results is generated. The analytical results are received by the AR interface for determining a root cause of the incident report.

These and other features, aspects and advantages of the present invention will become understood with reference to the following description, appended claims and accompanying figures.

BRIEF DESCRIPTION OF THE DRAWINGS

FIG. 5 is a block diagram illustrating a distributed system for diagnosing data center incidents with AR and cognitive analytics, according to one embodiment;

DETAILED DESCRIPTION

Figure 1:
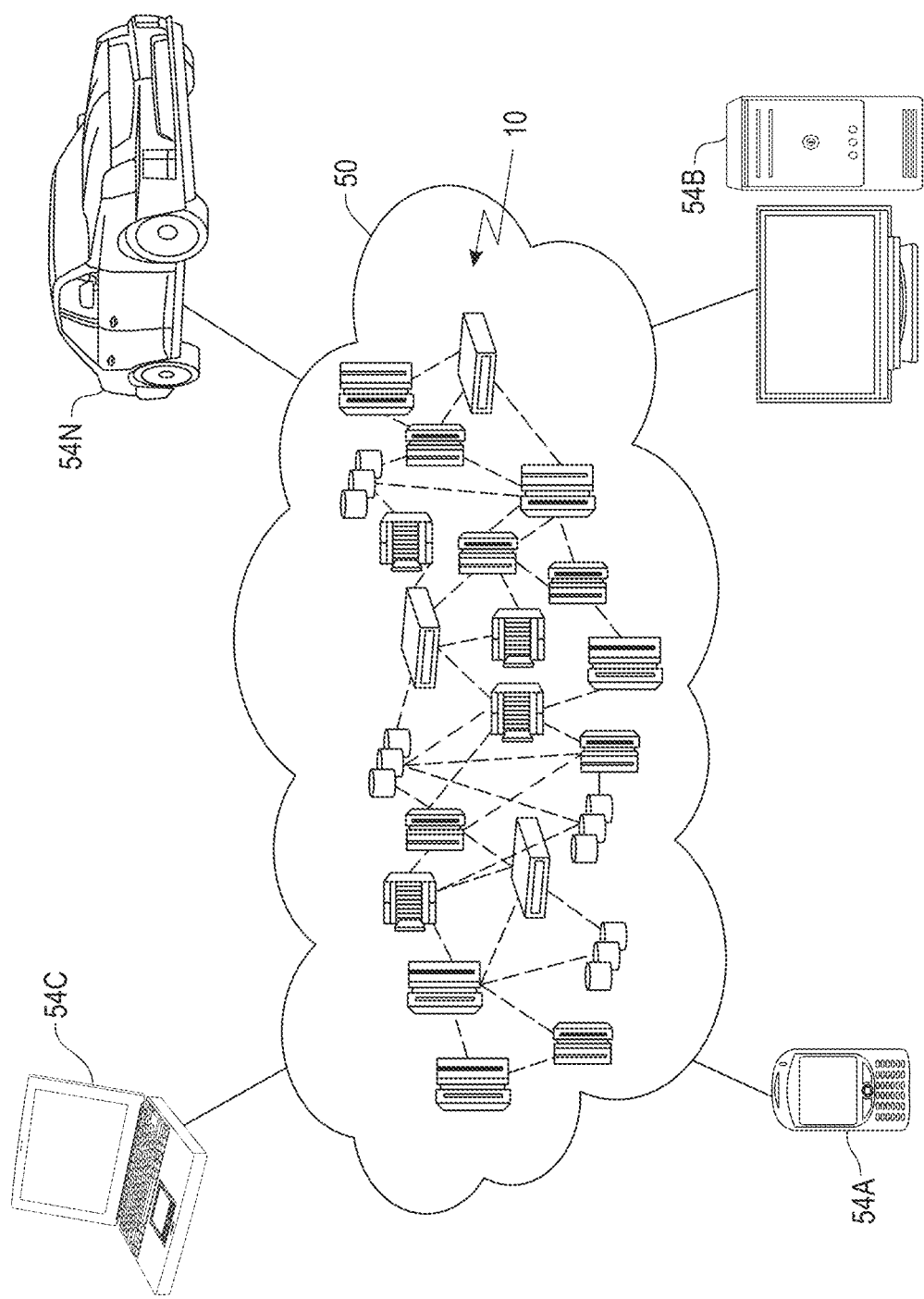
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to diagnosing data center incidents with augmented reality (AR) and cognitive analytics. One embodiment provides a method for diagnosing data center incidents including receiving a data center incident report including information technology (IT) device incident information. AR is applied for an AR interface for receiving incident evidence information based on the IT device incident information. The incident evidence information is sent to a cognitive analytical process. Using the cognitive analytical process, statistical inference is determined and an incident diagnosis recommendation including analytical results is generated. The analytical results are received by the AR interface for determining a root cause of the incident report.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
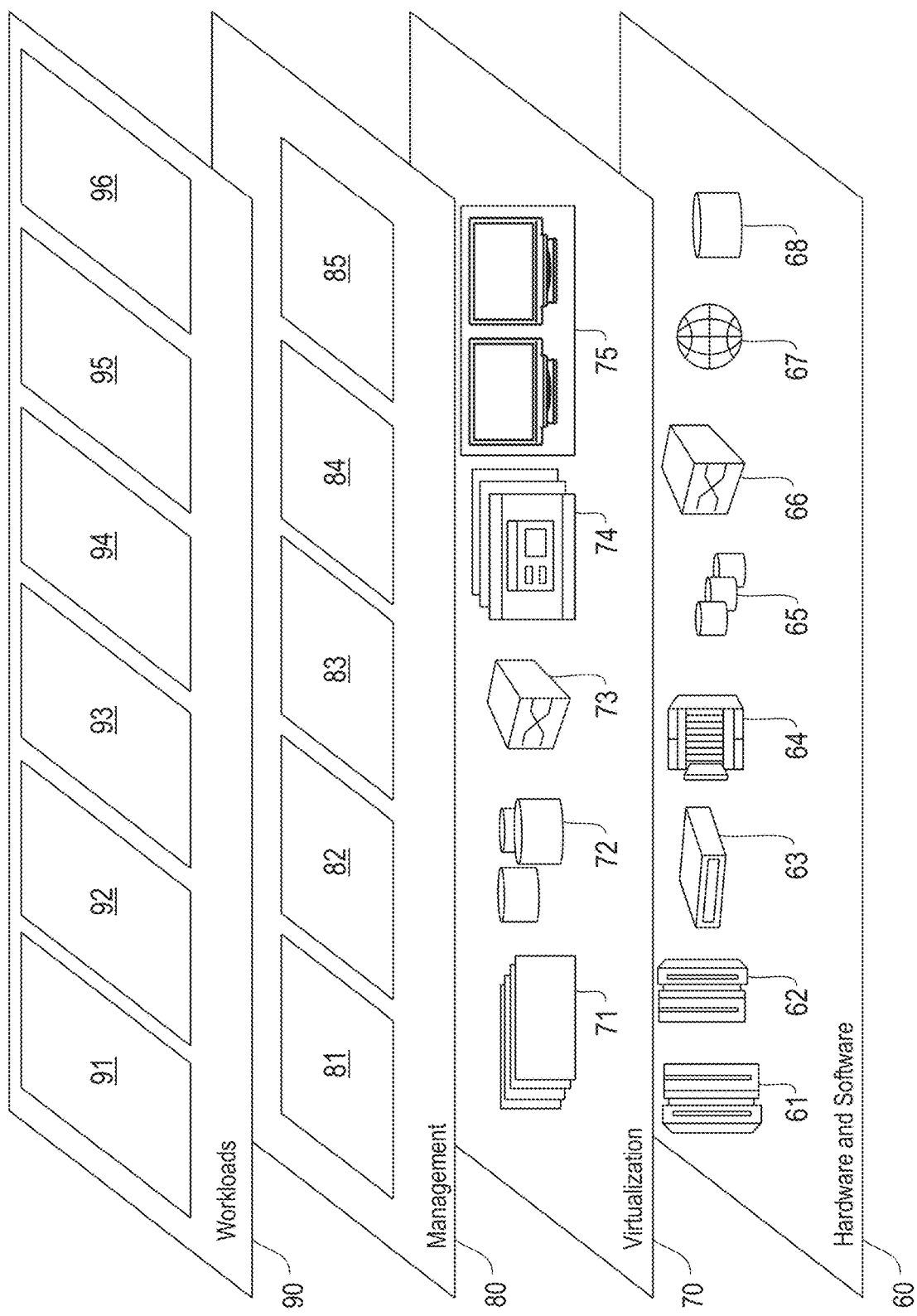
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and diagnosing data center incidents with AR and cognitive analytics processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), hardware system 400 (FIG. 4) or the cloud computing environment 50 (FIG. 1), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
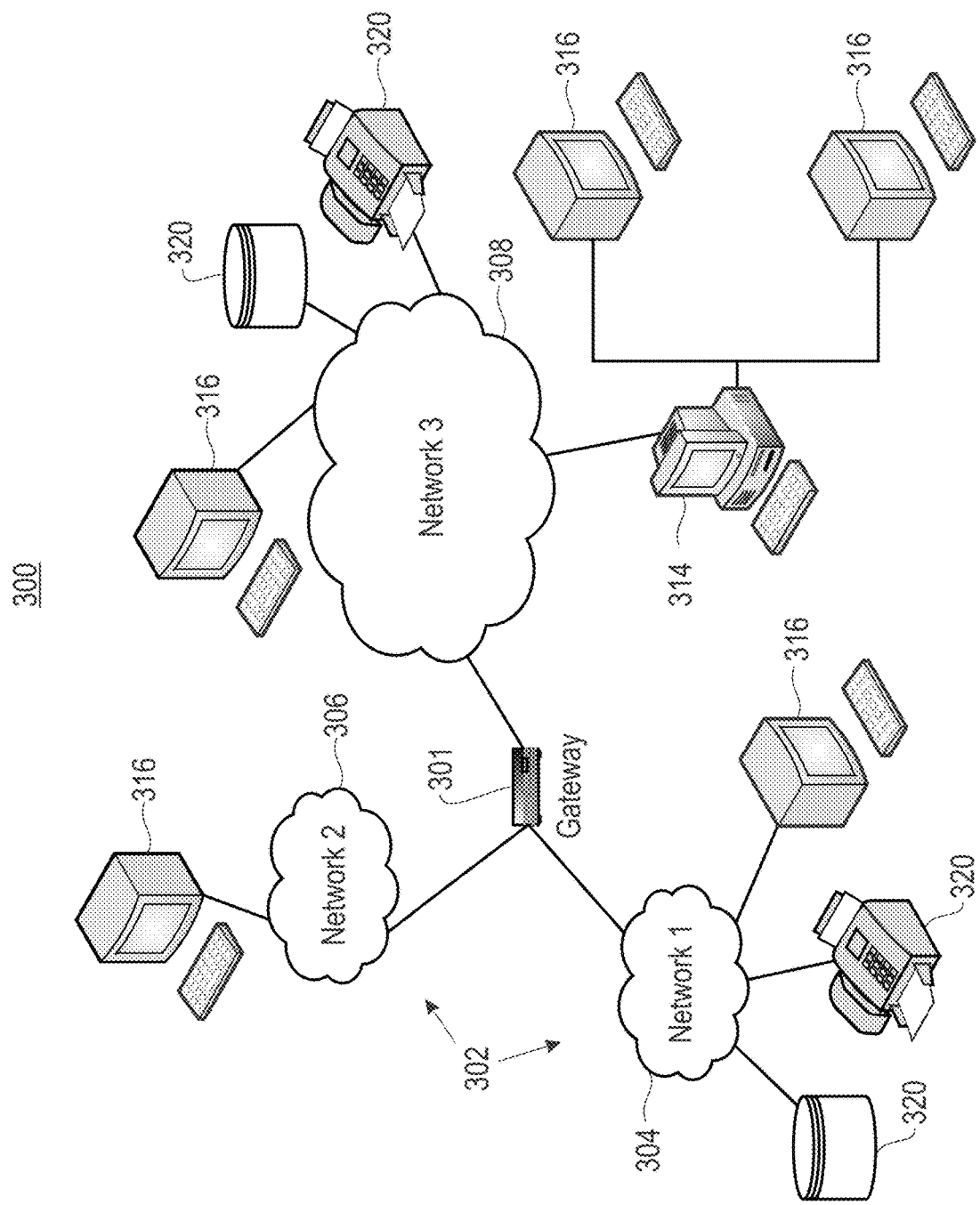
FIG. 3 is a network architecture of a system for diagnosing data center incidents with augmented reality (AR) and cognitive analytics, according to an embodiment.

FIG. 3 is a network architecture of a system 300 for diagnosing data center incidents with augmented reality (AR) and cognitive analytics, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
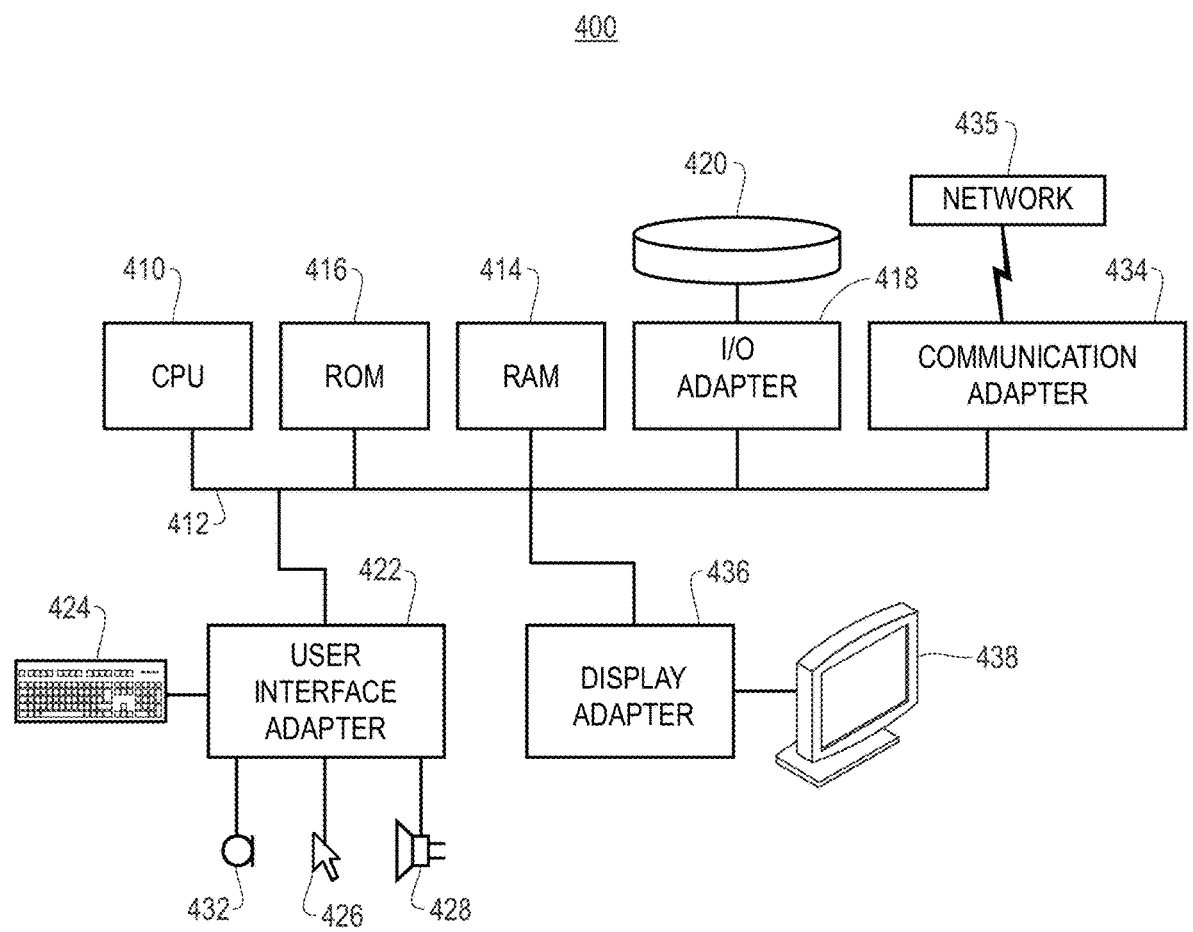
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a system 500 that may be employed for diagnosing data center incidents with AR and cognitive analytics, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 provides diagnosis of root causes of data center incidents efficiently and accurately, using AR techniques and cognitive analytics. Conventional AR troubleshooting systems are focused on AR, which displays the information to end users by querying a solution database, which does not use any root cause analysis involved in the back end. Conventional root cause analysis systems perform by comparing the event with an existing event cause model data store, which includes only a static analysis that retrieves event profiles with fixed causal relationships and probabilities. In one embodiment, in system 500: 1) the entire data center infrastructure is modeled using graphical models, such as Bayesian networks; 2) AR is applied to display the cause analysis information to the user in the front end, serving as an interface (e.g., AR interface 810, FIG. 8) between the user's input in the field and the back end cognitive analytical engine (e.g., a component in an enterprise network, computing node 10, FIG. 1, hardware and software layer 60, FIG. 2, processing system 300, FIG. 3, system 400, FIG. 4, system 500, FIG. 5, etc.); 3) a cognitive analytical engine (e.g., a component in an enterprise network, computing node 10, FIG. 1, hardware and software layer 60, FIG. 2, processing system 300, FIG. 3, system 400, FIG. 4, system 500, FIG. 5, etc.) analyzes the causes by dynamically drawing statistical inferences from the graphical model given the current input provided by the user through AR, and then sends the cause analysis information back to the front end; and 4) items 2) and 3) are iterated until the root cause is finally identified.

Figure 6:
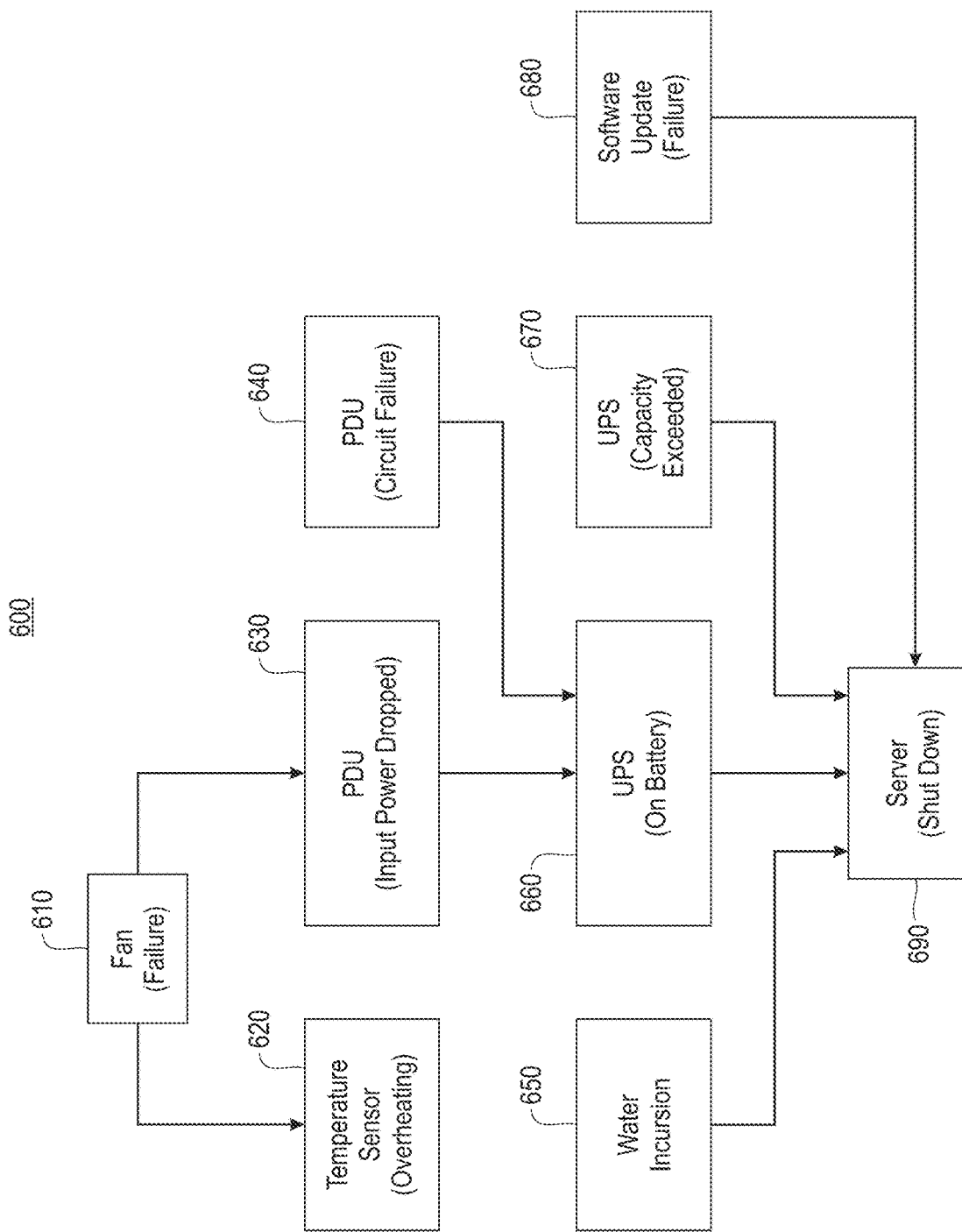
FIG. 6 illustrates an example Bayesian network that may be used for diagnosing data center incidents with AR, according to one embodiment.

FIG. 6 illustrates an example Bayesian network 600 that may be used for diagnosing data center incidents with AR, according to one embodiment. At the top of the example Bayesian network 600, a fan (failure) 610 is connected to possible device failures including: temperature sensor (overheating) 620, power distribution unit (PDU) (input power dropped) 630, and PDU (circuit failure) 640. The PDU 630 and PDU 640 are connected to UPS (on battery) 660. On the same level as the UPS 660, the example Bayesian network 600 includes water incursion 650, UPS (capacity exceeded) 670 and software update (failure) 680. Connected to the previous level is server (shut down) 690. In one embodiment, the enterprise system uses graphical models, such as a Bayesian network (e.g., example Bayesian network 600), as the back end cognitive analytical engine.

In one embodiment, a Bayesian network is applied to model the probabilistic relationships between data center incidents (symptoms) and the states of IT devices (causes), and draw a statistical inference. In one embodiment, a Bayesian network is a directed acyclic graph (DAG), where nodes represent random variables and edges represent conditional dependencies. Nodes that are not connected (no path between variables in the network) represent variables that are conditionally independent of each other. In one embodiment, each node is associated with a probability function that takes, as input, a set of values from the node's parent variables, and outputs the probability (or probability distribution) of the variable represented by the node. The example Bayesian network 600 is a simple example. In one embodiment, a Bayesian network is used for modeling the probabilistic relationships between the events happening in a data center.

In one embodiment, the parameters of the Bayesian network deployed have to be learned before drawing any inference. Bayesian network, $B=(G, \Theta)$, is a DAG G that has a joint distribution over a set of random variables $x=\{x_1, \ldots, x_n\}$. In one embodiment, the random variables are represented as nodes, and direct relationships between these random variables are represented as edges. If there is a directional edge from variable $x_i$ to $x_j$, $x_i$ is referred to as $x_j$'s parent. The set of training data is denoted as $D=\{u_1, \ldots, u_M\}$, where M is the total data size. Suppose the training data are all observed (complete data), in one embodiment the maximum likelihood estimators (MLE) are used to estimate all the parameters. In one embodiment, the join probability (or likelihood function) of the network is written as:

$$P(u_1, \ldots, u_M \mid \Theta) = \prod_{i=1}^{M} P(x_1^i, \ldots, x_n^i \mid \Theta) = \prod_{i=1}^{M} \prod_{j=1}^{n} P(x_j^i \mid \pi_{x_j})$$

where $\pi_{x_j}$ denotes the state of any combination of the parents of $x_j$, and $x_j^i$ denotes the value of the jth variable in the ith sample. In one embodiment, the relative frequency of the cases are used in the training data to derive the ML estimators. Let $x_i=k$ denote that the ith variable takes the kth possible state. In one embodiment, the conditional probability of $x_i=k$ given its parents $\pi_{xi}$ is $$\theta_{x_i, \Pi_{x_i}, k} = \frac{N\left(x_i = k, \prod_{x_i}\right)}{\sum_{k} N\left(x_i = k, \prod_{x_i}\right)} \quad \text{Eq. 1}$$

where N ( ) is the frequency of observing that case.

When the training data is complete, the network parameters are inferred using MLE in Eq (1). In real world applications, however, the data may have missing values or some variables are not observed, due to high cost of data collection, data entering errors, or sensor reading problems. In one embodiment, an Expectation Maximization (EM) process is used to estimate the parameters of the Bayesian network with missing data or incomplete information. Suppose $Y=(Y_1, \ldots Y_M)$ is the observed data and $Z=(Z_1, \ldots, Z_M)$ is the missing data. The complete data is $D=(Y, Z)$. In one embodiment, the EM processing follows an iterative approach, starting with an initial guess of parameters $\Theta^{(0)}$, and then iteratively generates succeeding parameters, $\Theta^{(1)}$, $\Theta^{(2)}$, . . . . In one embodiment, in each iteration, the following two steps are used:

Step E: compute the conditional expectation of log-likelihood function of the observed data:

$$Q(\Theta \mid \Theta^{(t)}) = E_\Theta(\log p(D \mid \Theta) \mid \Theta, Y).$$

Step M: find the parameters that maximize the computed expectation:

$$\Theta^{(t+1)} = \arg\max_{\Theta} Q(\Theta \mid \Theta^{(t)}).$$

In one embodiment, the two steps E and M are repeated until the estimated log-likelihood converges. In one embodiment, the processing described above is used to infer all the conditional probability tables (the joint probability distribution for a variable) in the Bayesian network. After that, the Bayesian network is ready for inference using the Bayesian rules. Given a data center incident and the observed states of IT assets, in one embodiment the probability of an IT asset being in a certain state given the happening of an incident is determined. For example, in the example Bayesian network 600, the probability of a UPS switching to "on battery" mode (UPS (on battery) 660 given the incident that a server 690 is shut down. Note that the probability of the variables can be changed if values of other variables in the Bayesian network are updated. The collected additional evidence produces updated posterior probabilities for other variables in the network with direct or indirect relationships. For example, given the observation that the PDU 630 input power was dropped, the probability of having a fan 610 failure will increase, if the temperature sensor 620 also indicated overheating. Users can also know the factors that will influence a target variable by changing the probability for a variable of interest. In one embodiment, the possible root cause can therefore be diagnosed by tracking these probabilities. For example, if a server 690 was shut down, an inference is made that there is a 70% chance (block 835, FIG. 8) that the UPS capacity exceeded (block 830, FIG. 8), a 15% (block 845, FIG. 8) chance the UPS was on battery (block 840, FIG. 8), a 10% chance (block 855, FIG. 8) of having water incursion (block 850, FIG. 8), and a 5% chance (block 865, FIG. 8) of having software update failure (block 860, FIG. 8). These four variables are regarded as direct causes. In this case, the cognitive analytical engine deployed can make recommendations that the main reason that the server was shut down was because the UPS capacity exceeded.

Figure 7:
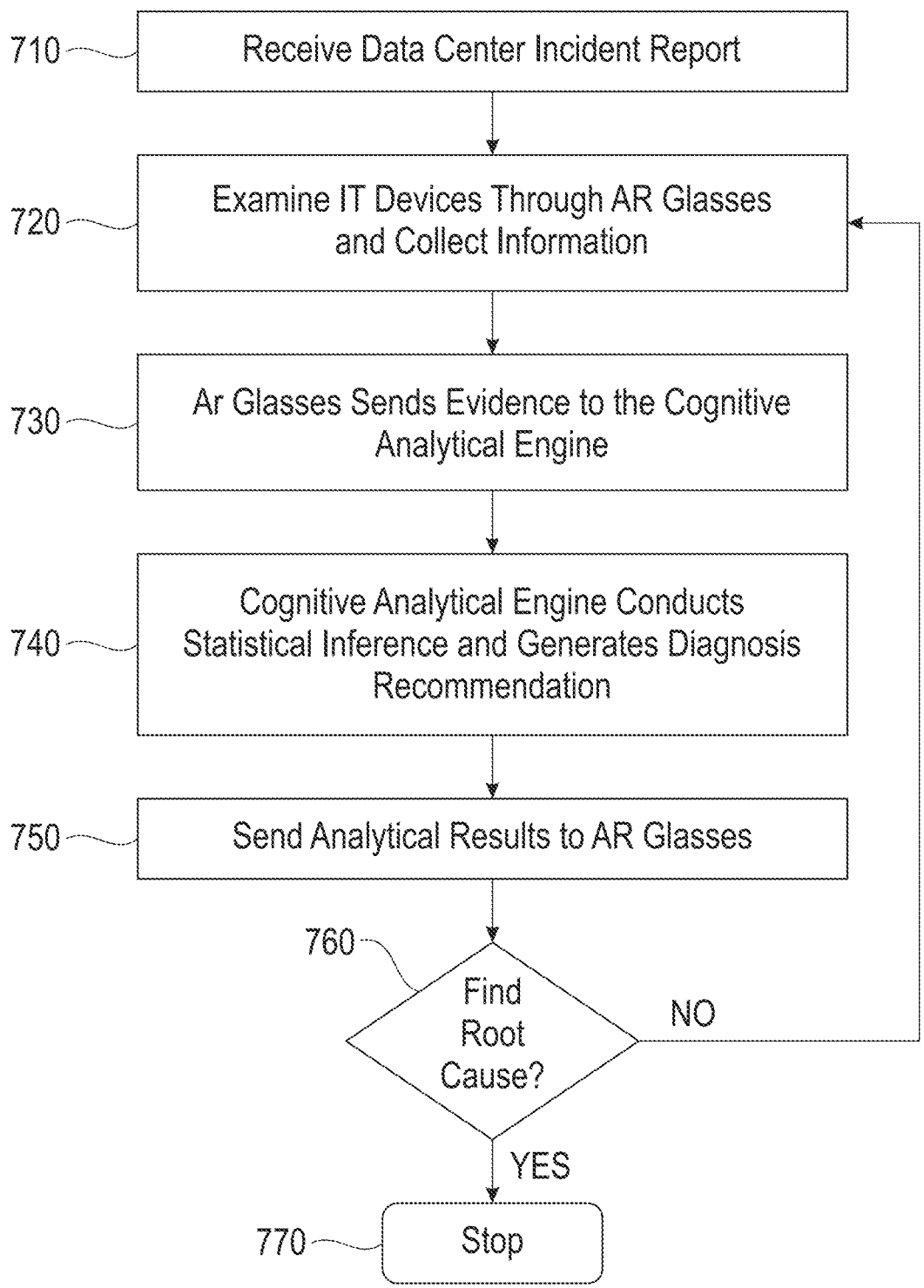
FIG. 7 illustrates a workflow for diagnosing data center incidents with AR, according to one embodiment.

FIG. 7 illustrates a workflow 700 for diagnosing data center incidents with AR, according to one embodiment. In one embodiment, in block 710 the workflow 700 receives a data center incident report (e.g., indicating one or more device failures). In block 720, the workflow 700 examines IT devices through AR glasses (e.g., AR interface 810, FIG. 8) and collects information. In block 730, the AR glasses sends evidence to a cognitive analytical engine (e.g., a hardware processor device or component in an enterprise network, computing node 10, FIG. 1, hardware and software layer 60, FIG. 2, processing system 300, FIG. 3, system 400, FIG. 4, system 500, FIG. 5, etc.). In block 740, the cognitive analytical engine conducts statistical inference processing and generates a diagnosis recommendation. In one embodiment, in block 750 the analytical results are sent to the AR glasses. In block 760 it is determined whether the root cause is found or not. If the root cause is not found, the workflow 700 returns to block 720. Otherwise, the workflow 700 proceeds to block 770 and stops processing.

Figure 8:
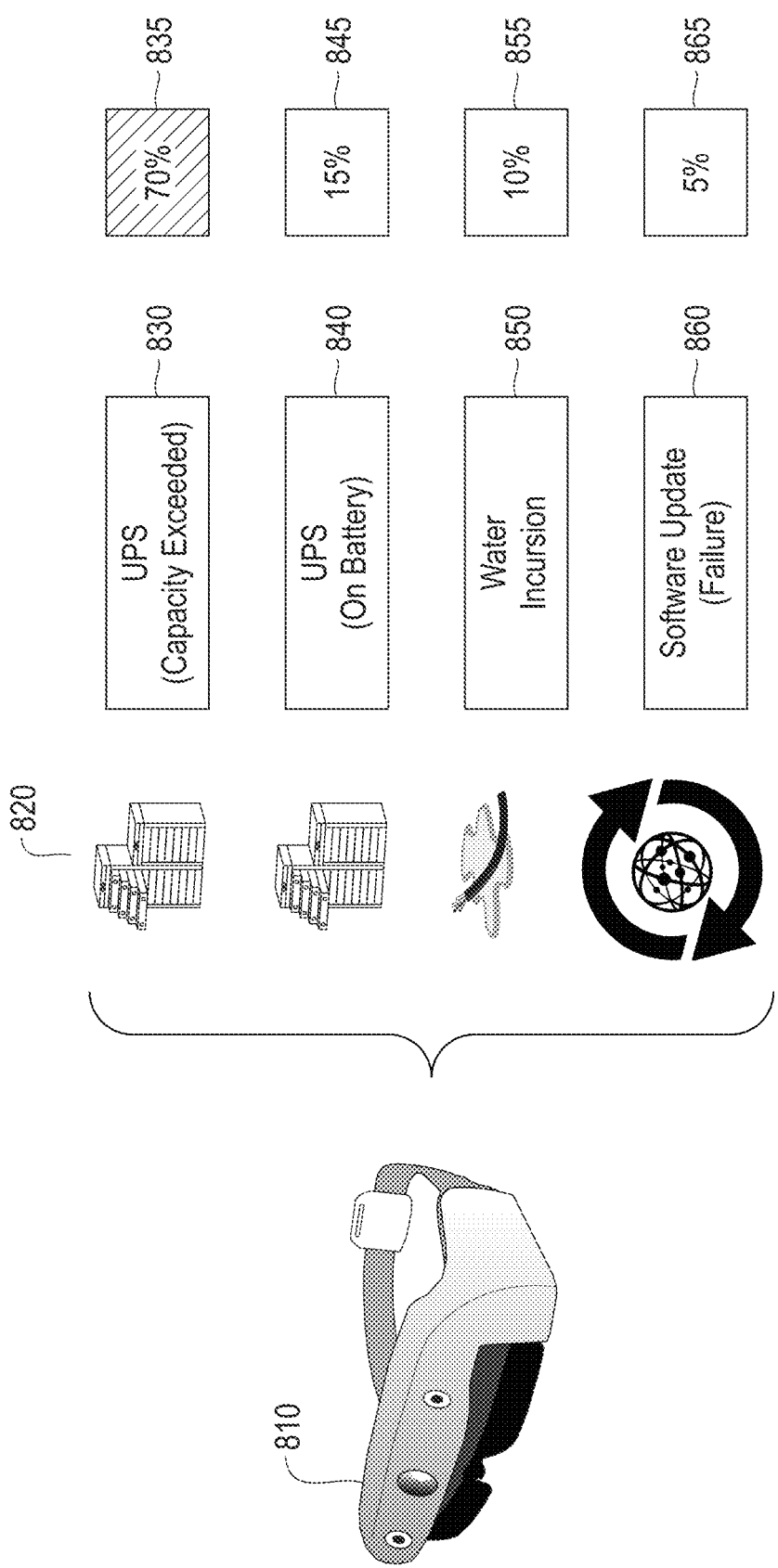
FIG. 8 illustrates an example AR interface that may be used for diagnosing data center incidents with AR, according to one embodiment.

FIG. 8 illustrates an example AR interface 810 (e.g., AR glasses) that may be used for diagnosing data center incidents with AR, according to one embodiment. AR is a way of human-computer interaction where virtual objects and information are added to real scenes provided by one or more video cameras in real time. In one embodiment, the root cause analysis information from the cognitive analytical engine (e.g., a component in an enterprise network, computing node 10, FIG. 1, hardware and software layer 60, FIG. 2, processing system 300, FIG. 3, system 400, FIG. 4, system 500, FIG. 5, etc.) is added to the real scenes of IT devices. In one embodiment, the user will wear a pair of special glasses with AR functions in the field (e.g., AR interface 810). Given a data center incident, when she looks at a particular object (i.e., IT device) through the AR interface 810, an icon/representation 820 may be displayed (e.g., a real scene showing a representation of the actual IT object, an icon, a name, object name with failure, text information, visual, video, etc.) and the probability of that object having an issue (calculated by the analytical back end) is also automatically displayed. After the user examines the object, she can provide observations or evidences through the AR interface, which is sent back to the analytical engine. In one embodiment, with the new information, the back end will update all the probabilities dynamically, and send the analytical results back to the AR interface 810. In one embodiment, the user will also see the recommendation result from the back end with the AR interface 810, which highlights the objects with the top probabilities being causes. This iteration continues until the user finally identifies the root cause.

Figure 9:
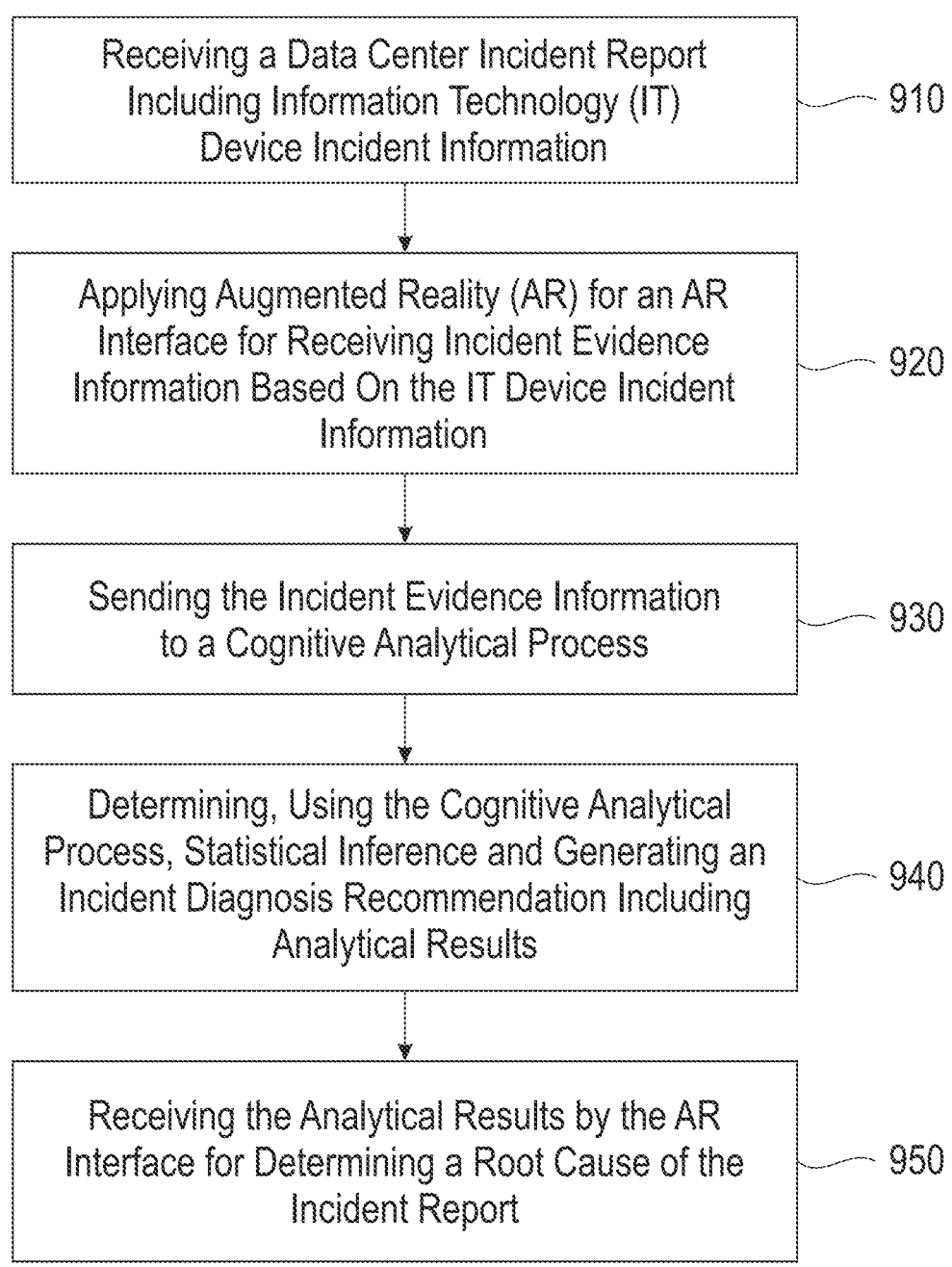
FIG. 9 illustrates a block diagram of a process for diagnosing data center incidents with AR and cognitive analytics, according to one embodiment.

FIG. 9 illustrates a block diagram for process 900 for diagnosing data center incidents with AR, according to one embodiment. In block 910, process 900 receives a data center incident report including IT device incident information (e.g., by a processor from computing node 10, FIG. 1, hardware and software layer 60, FIG. 2, processing system 300, FIG. 3, system 400, FIG. 4, system 500, FIG. 5, AR interface 800, FIG. 8, etc.). In block 920, process 900 applies A) for an AR interface (e.g., AR interface 810, FIG. 8) for receiving incident evidence information based on the IT device incident information. In block 930, process 900 sends the incident evidence information to a cognitive analytical process. In block 940, process 900 determines, using the cognitive analytical process, statistical inference and generating an incident diagnosis recommendation including analytical results. In block 950, process 900 receives the analytical results by the AR interface for determining a root cause of the incident report.

In one embodiment, in process 900 a data center infrastructure is modeled using at least one graphical model for determining the statistical inference. In one embodiment, the at least one graphical model is based on a Bayesian network.

In one embodiment, in process 900 the cognitive analytical process analyzes IT device incident causes by dynamically drawing statistical inferences from the at least one graphical model using current input provided through the AR interface. In one embodiment, multiple iterations of performing statistical inference and generating incident diagnosis recommendations including analytical results are performed to determine the root cause of the incident report.

In one embodiment, in process 900 incident evidence information produces updated posterior probabilities for other variables in a Bayesian network with direct or indirect relationships. In one embodiment, the at least one graphical model models probabilistic relationships between data center incidents and states of IT devices, and determines the statistical inference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for diagnosing data center incidents comprising:
   receiving a data center incident report including information technology (IT) device incident information;
   applying augmented reality (AR) for an AR interface for receiving incident evidence information based on the IT device incident information;
   sending the incident evidence information to a cognitive analytical process;
   determining, using an estimation process, estimated parameters for parameters with missing data from the incident evidence information;
   determining, using the cognitive analytical process, statistical inference and generating an incident diagnosis recommendation including analytical results based on the incident evidence and the estimated parameters; and
   receiving the analytical results by the AR interface for determining a root cause of the incident report.

2. The method of claim 1, wherein a data center infrastructure is modeled using at least one graphical model for determining the statistical inference.

3. The method of claim 2, wherein the at least one graphical model is based on a Bayesian network, the parameters with missing data are parameters of the Bayesian network, and the estimation process is an expectation maximization process.

4. The method of claim 3, wherein the cognitive analytical process analyzes IT device incident causes by dynamically drawing statistical inferences from the at least one graphical model using current input provided through the AR interface, and the expectation maximization process includes first processing that determines a conditional expectation of a log-likelihood function of observed data and second processing that determines the estimated parameters that maximize the conditional expectation.

5. The method of claim 3, wherein incident evidence information produces updated posterior probabilities for other variables in the Bayesian network with direct or indirect relationships.

6. The method of claim 2, wherein the at least one graphical model models probabilistic relationships between data center incidents and states of IT devices, and determines the statistical inference.

7. The method of claim 1, wherein multiple iterations of performing statistical inference and generating incident diagnosis recommendations including analytical results are performed to determine the root cause of the incident report.

8. A computer program product for diagnosing data center incidents, the computer program product comprising a non-transitory computer readable storage medium having program instructions embodied therewith, the program instructions executable by a processor to cause the processor to:
receive, by the processor, a data center incident report including information technology (IT) device incident information;
apply, by the processor, augmented reality (AR) for an AR interface for receiving incident evidence information based on the IT device incident information;
send, by the processor, the incident evidence information to a cognitive analytical process;
determine, by the processor, estimated parameters for parameters with missing data from the incident evidence information based on an estimation process;
determine, by the processor, statistical inference using the cognitive analytical process, and generating an incident diagnosis recommendation including analytical results based on the incident evidence and the estimated parameters; and
receive, by the processor, the analytical results by the AR interface for determining a root cause of the incident report.

9. The computer program product of claim 8, wherein a data center infrastructure is modeled using at least one graphical model for determining the statistical inference.

10. The computer program product of claim 9, wherein the at least one graphical model is based on a Bayesian network, the parameters with missing data are parameters of the Bayesian network, and the estimation process is an expectation maximization process.

11. The computer program product of claim 10, wherein the cognitive analytical process analyzes IT device incident causes by dynamically drawing statistical inferences from the at least one graphical model using current input provided through the AR interface, and the expectation maximization process includes first processing that determines a conditional expectation of a log-likelihood function of observed data, and includes second processing that determines the estimated parameters that maximize the conditional expectation.

12. The computer program product of claim 10, wherein incident evidence information produces updated posterior probabilities for other variables in the Bayesian network with direct or indirect relationships.

13. The computer program product of claim 9, wherein the at least one graphical model models probabilistic relationships between data center incidents and states of IT devices, and determines the statistical inference.

14. The computer program product of claim 8, wherein multiple iterations of performing statistical inference and generating incident diagnosis recommendations including analytical results are performed to determine the root cause of the incident report.

15. An apparatus comprising:
a memory configured to store instructions; and
a processor configured to execute the instructions to:
receive a data center incident report including information technology (IT) device incident information;
apply augmented reality (AR) for an AR interface for receiving incident evidence information based on the IT device incident information;
send the incident evidence information to a cognitive analytical process;
determine, using an estimation process, estimated parameters for parameters with missing data from the incident evidence information;
determine statistical inference using the cognitive analytical process, and generate an incident diagnosis recommendation including analytical results based on the incident evidence and the estimated parameters; and
receive the analytical results by the AR interface for determining a root cause of the incident report.

16. The apparatus of claim 15, wherein a data center infrastructure is modeled using at least one graphical model for determining the statistical inference.

17. The apparatus of claim 16, wherein the at least one graphical model is based on a Bayesian network, the parameters with missing data are parameters of the Bayesian network, and the estimation process is an expectation maximization process.

18. The apparatus of claim 17, wherein:
the cognitive analytical process analyzes IT device incident causes by dynamically drawing statistical inferences from the at least one graphical model using current input provided through the AR interface;
the expectation maximization process includes first processing that determines a conditional expectation of a log-likelihood function of observed data, and includes second processing that determines the estimated parameters that maximize the conditional expectation; and
multiple iterations of performing statistical inference and generating incident diagnosis recommendations including analytical results are performed by the processor to determine the root cause of the incident report.

19. The apparatus of claim 17, wherein incident evidence information produces updated posterior probabilities for other variables in the Bayesian network with direct or indirect relationships.

20. The apparatus of claim 17, wherein the at least one graphical model models probabilistic relationships between data center incidents and states of IT devices, and determines the statistical inference.

* * * * *